Nov. 24, 1925.
S. N. CUTLIP
COLLAR BRACE
Filed Aug. 12, 1924
1,563,168
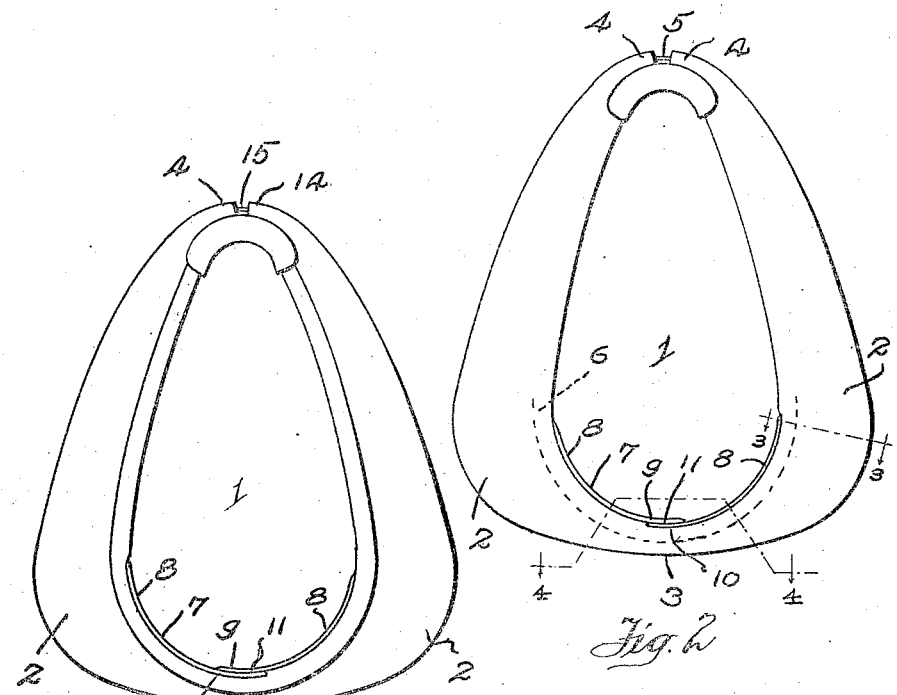
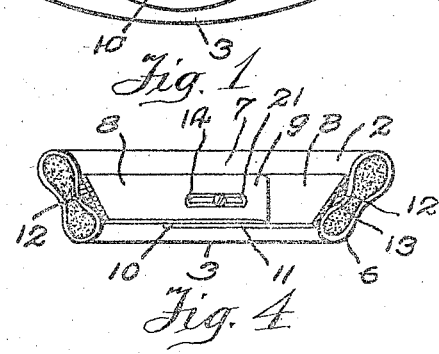
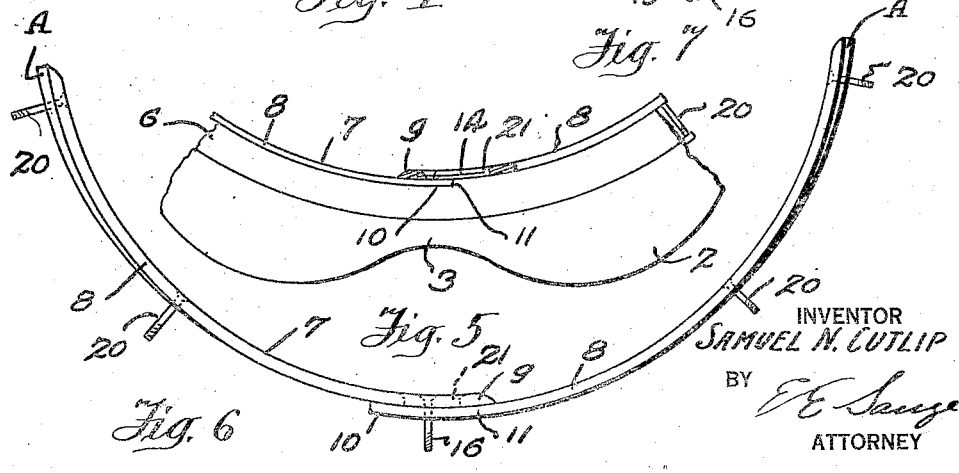
INVENTOR
SAMUEL N. CUTLIP
BY
ATTORNEY Patented Nov. 24, 1925.

1,563,168

UNITED STATES PATENT OFFICE.

SAMUEL N. CUTLIP, OF WALLA WALLA, WASHINGTON.

COLLAR BRACE.

Application filed August 12, 1924. Serial No. 731,542.

*To all whom it may concern:*

Be it known that I, SAMUEL N. CUTLIP, a citizen of the United States, residing at Walla Walla, in the county of Walla Walla and State of Washington, have invented certain new and useful Improvements in Collar Braces, of which the following is a specification.

This invention relates to collar braces and has as one of its objects to provide a brace for horse collars and the like that will prevent the collar breaking at the throat caused by a continued movement at this point due to the removal of and placing on of the collar.

Another object of the invention is to provide a brace that is sufficiently yielding so that it will not interfere with the "setting" of the collar to the animal.

A further object of the invention is to provide a brace that is relatively light in weight.

A further object of the invention is to provide a brace that may be conveniently attached to any collar without material alteration.

With these and other objects in view reference is now had to the accompanying drawings in which—

Fig. 1 is a front elevation of a collar showing brace attached;

Fig. 2 is a rear elevation of a collar showing brace attached;

Fig. 3 shows a fragment of a collar and brace, enlarged, taken on the line 3—3 of Fig. 2;

Fig. 4 shows a fragment of a collar and brace, enlarged, taken on the line 4—4 of Fig. 2;

Fig. 5 is a front elevation of the throat portion of a collar, enlarged, showing the position of that portion when the collar is opened;

Fig. 6 is a side elevation of the brace detached; and

Fig. 7 is an enlarged detail view of a portion of the sliding joint of the brace.

Having reference to the drawings like numerals refer to like parts throughout the several views and the numeral 1 refers to a horse collar consisting essentially of collar pads 2, a narrow throat portion 3, ends 4, held together by a strap 5, and a roll 6 between which and the collar pads hames (not shown) are attached in the usual manner.

Adapted to be secured within the collar is a brace 7 consisting of a pair of yielding strips 8—8 having their inner ends, 9 and 10 respectively, overlapped and joined to form a sliding joint 11 that will be presently explained.

These strips are constructed of spring material to provide flexibility thereto so as to yield with the movement of the collar, and may consist of shapes substantially flat or rectangular in cross section throughout their length or may have a special shape, with the ends 9 and 10 substantially rectangular with their outer ends formed to conform to the inside of the collar, as shown at A in Fig. 6. When made rectangular however a filler 12 may be employed to fill in the crease 13 between the pad 2 and the roll 6 to provide a natural seat for the brace.

The sliding joint is constructed by overlapping the ends 9 and 10 as above explained and providing in the top end 9 a slot 14 and in the bottom end 10 a hole 15 the latter of which to rigidly engage a bolt 16 having a countersunk head 17 and a square shoulder 18, both of which slidably engage the slot 14.

The bolt 16 is preferably provided further with a shoulder 19 to prevent it turning in the hole 15, both of which shoulders being provided to maintain perfect alignment of the strips 8, and yet secure the under end 10, in a manner to be explained, without binding the top end 9 in the slot 14.

The slot 14 is of a length to limit the longitudinal movement of the pair of yielding strips at the sliding joint and to provide for amply opening the collar when placing it on or removing it from the animal, and thus to limit the throat portion of the collar to protect it from excessive stretching that through continued working would eventually break it.

The collar brace is further provided with bolts 20, having preferably countersunk heads, and are passed through the strips and through the collar, between the collar pad 2 and the roll 6, and these bolts and including the bolt 16 provide means to attach the brace to the collar.

In use the collar is closed and fastened by the strap 5 to the desired width ascertained by placing it on the animal, the yielding strips are then placed in position in the collar with the head 17 of the bolt 16 resting against the end 21 of the slot 14, with the bolt holes thereof directly over the crease 13, and the bolt holes are then located and punched after which the straps are secured to the collar by the above mentioned bolts.

It is now obvious that upon opening the collar the distance between the ends 4 will be substantially regulated by the length of the slot 14 which is of sufficient length to limit the opening to a size that will enable the collar to be placed on the animal without unduly stretching the throat portion of the collar.

By this means the fabric of the collar at this point is saved from rupture, and as the yielding strips are relatively thin and as the ends are rounded off as shown, the brace will not interfere with or chafe the neck of the animal.

It is well known that a collar gets shaped or "set" to a horse after considerable wearing and in consequence of this the straps are made sufficiently yielding, as compared with the stiffness of the collar so as not to affect this "setting."

Having thus described my invention, I claim:

1. In a collar brace, a pair of yielding strips having their ends overlapped and joined to form a sliding joint, and having a part adapted to conform to the inside of a collar, means to limit the movement of said joint and means including said last mentioned means to attach said brace to a collar.

2. In a collar brace, a pair of yielding strips having their ends overlapped to form a sliding joint, means to limit the movement of said joint, said means consisting of a bolt rigidly engaged by one of said strips and positioned to slidably engage the other of said strips, and means including said bolt to attach said brace to a collar.

In testimony whereof I affix my signature.

SAMUEL N. CUTLIP.